United States Patent
Bourgin et al.

(10) Patent No.: US 11,726,355 B2
(45) Date of Patent: Aug. 15, 2023

(54) OPTICAL ELEMENT FOR INFLUENCING LIGHT DIRECTIONS, ARRANGEMENT FOR IMAGING A MULTIPLICITY OF ILLUMINATED OR SELF-LUMINOUS SURFACES, AND ILLUMINATION DEVICE

(71) Applicant: siOPTICA GmbH, Jena (DE)

(72) Inventors: Yannick Bourgin, Ilmtal-Weinstrasse OT Ossmannstedt (DE); André Heber, Weimar (DE); Markus Klippstein, Jena (DE)

(73) Assignee: siOPTICA GmbH, Jena (DE)

( * ) Notice: Subject to any disclaimer, the term of this patent is extended or adjusted under 35 U.S.C. 154(b) by 0 days.

(21) Appl. No.: 17/759,431

(22) PCT Filed: Mar. 29, 2021

(86) PCT No.: PCT/EP2021/058169
§ 371 (c)(1),
(2) Date: Jul. 25, 2022

(87) PCT Pub. No.: WO2021/204582
PCT Pub. Date: Oct. 14, 2021

(65) Prior Publication Data
US 2023/0047322 A1 Feb. 16, 2023

(30) Foreign Application Priority Data

Apr. 7, 2020 (DE) .................. 10 2020 002 323.1

(51) Int. Cl.
*G02B 26/00* (2006.01)
*G02F 1/163* (2006.01)
(Continued)

(52) U.S. Cl.
CPC .......... *G02F 1/092* (2013.01); *G02B 26/005* (2013.01); *G02B 27/0093* (2013.01);
(Continued)

(58) Field of Classification Search
CPC .............. G11B 7/0065; G11B 7/24044; G11B 7/00781; G11B 7/245; G11B 7/252;
(Continued)

(56) References Cited

U.S. PATENT DOCUMENTS

| 5,956,107 A | 9/1999 | Hashimoto et al. |
| 2007/0008456 A1 | 1/2007 | Lesage et al. |

(Continued)

FOREIGN PATENT DOCUMENTS

| CN | 1987606 A | 6/2007 |
| CN | 106195766 A | 12/2016 |

(Continued)

*Primary Examiner* — Brandi N Thomas
(74) *Attorney, Agent, or Firm* — Christensen, Fonder, Dardi & Herbert PLLC

(57) ABSTRACT

An optical element including a plate-shaped substrate with a light-entrance surface and a light-exit surface, a multiplicity of imaging elements formed on the light-exit surface and a multiplicity of diaphragms formed on the light-entrance surface. Each diaphragm includes a transparent geometric region in an opaque region. The optical element can be switched between two operating modes B1 and B2 such that some of the imaging elements change their focal length between values f1 and f2 and/or, some of the diaphragms change their aperture width and/or their position. Exactly one diaphragm is associated with each imaging element in mode B1 so that light passing through the diaphragm is imaged or collimated by the associated imaging element. Consequently, light arriving in the optical element through the diaphragms and then through the light-entrance surface has, after passing through the associated imaging elements in the two operating modes B1 and B2, different propagation angles.

14 Claims, 6 Drawing Sheets

(51) Int. Cl.
*G02F 1/09* (2006.01)
*G02F 1/29* (2006.01)
*G02B 27/00* (2006.01)

(52) U.S. Cl.
CPC .............. *G02F 1/163* (2013.01); *G02F 1/294* (2021.01); *G02B 2207/115* (2013.01)

(58) Field of Classification Search
CPC ..... G11B 7/246; G11B 7/2585; G11B 7/1275; G11B 7/26; G11B 7/083; G11B 7/0938; G11B 7/2463; G11B 7/2531; G11B 7/2534; G11B 7/256; G11B 7/2472; G11B 7/248; G11B 7/2533; G11B 7/2536; G11B 2007/0013; G11B 7/00772; G11B 7/2405; G11B 7/2467; G11B 7/249; G11B 7/2595; G11B 2007/00653; G11B 7/0045; G11B 7/005; G11B 7/0901; G11B 7/0908; G11B 7/24062; G11B 7/258; G11B 19/046; G11B 20/1217; G11B 2007/0006; G11B 2007/24304; G11B 2007/24312; G11B 2007/24314; G11B 2007/24316; G11B 2007/2432; G11B 2007/24324; G11B 2020/1287; G11B 2220/2504; G11B 27/10; G11B 27/3027; G11B 7/08594; G11B 7/0903; G11B 7/0906; G11B 7/1378; G11B 7/2403; G11B 7/24038; G11B 7/2433; G11B 7/2492; G11B 7/25; G11B 7/2539; G11B 7/2572; G11B 7/2575; G02B 19/0028; G02B 27/30; G02B 6/003; G02B 6/00; G02B 27/283; G02B 5/045; G02B 5/32; G02B 6/0035; G02B 5/3083; G02B 2027/011; G02B 2027/0116; G02B 2027/0123; G02B 2027/0125; G02B 2027/0132; G02B 2027/0134; G02B 2027/015; G02B 2027/0178; G02B 23/02; G02B 27/0025; G02B 27/0101; G02B 27/0172; G02B 27/0176; G02B 27/1006; G02B 27/106; G02B 27/145; G02B 27/28; G02B 27/286; G02B 30/25; G02B 30/35; G02B 5/04; G02B 5/30; G02B 5/3066; G02B 6/0056; G02B 6/2706; G02B 6/272; G02B 6/2766; G02B 6/2773; G02B 6/34; G02B 19/0061; G02B 19/0066; G02B 3/005; G02B 27/0927; G02B 3/0068; G02B 27/0961; G02B 27/425; G02B 3/0062; G02B 3/06; G02B 3/0006; G02B 3/0056; G02B 6/32; G02B 6/423; G02B 19/0014; G02B 2003/0093; G02B 3/08; G02B 5/0215; G02B 5/0231; G02B 5/0236; G02B 5/0242; G02B 6/0068; G02B 6/08; G02B 6/138; G02B 7/027; G02B 3/0075; G02B 6/0096; G02B 6/2817; G02B 6/42; G02B 6/43; G02B 13/0085; G02B 19/0023; G02B 19/0047; G02B 19/0057; G02B 2006/12102; G02B 2006/12104; G02B 2006/12107; G02B 27/0012; G02B 27/0955; G02B 27/0966; G02B 3/00; G02B 3/0012; G02B 3/0087; G02B 3/02; G02B 5/00; G02B 5/201; G02B 6/0003; G02B 6/0008; G02B 6/0018; G02B 6/0038; G02B 6/0053; G02B 6/0055; G02B 6/0073; G02B 6/0085; G02B 6/12204; G02B 6/122; G02B 6/1221; G02B 6/124; G02B 6/1245; G02B 6/136; G02B 6/4201; G02B 6/4214; G02B 6/4225; G02B 6/4233; G02B 6/4245; G02B 7/04; G02B 7/36; G02B 1/02; G02B 1/08; G02B 15/00; G02B 17/0657; G02B 26/004; G02B 26/005; G02B 27/0075; G02B 27/1013; G02B 27/142; G02B 27/285; G02B 27/62; G02B 3/0031; G02B 3/10; G02B 3/14; G02B 5/223; G02B 5/26; G02B 5/3016; G02B 6/02047; G02B 6/262; G02B 6/322; G02B 6/3834; G02B 6/3839; G02B 3/3853; G02B 6/3882; G02B 6/403; G02B 6/4203; G02B 6/4204; G02B 6/4215; G02B 6/4292; G02B 6/44; G02B 7/021; G02F 1/0136; G02F 1/133603; G02F 1/133607; G02F 1/133606; G02F 1/133605; G02F 1/133611; G02F 1/13306; G02F 1/133311; G02F 1/133331; G02F 1/133382; G02F 1/133385; G02F 1/133526; G02F 1/133615; G02F 1/133628; G02F 1/13363; G02F 1/133638; G02F 1/133738; G02F 1/133742; G02F 1/134309; G02F 1/134363; G02F 1/13439; G02F 1/13471; G02F 1/135; G02F 1/141; G02F 1/1418; G02F 1/216; G02F 1/29; G02F 2203/05; G02F 2203/055; G02F 2203/06; G02F 2203/50; G02F 1/09; G02F 1/1336; G02F 1/133608; G02F 1/133614

See application file for complete search history.

(56) References Cited

U.S. PATENT DOCUMENTS

| | | | |
|---|---|---|---|
| 2007/0030240 | A1 | 2/2007 | Sumiyoshi et al. |
| 2007/0070476 | A1 | 3/2007 | Yamada et al. |
| 2009/0073329 | A1 | 3/2009 | Hsu et al. |
| 2015/0293402 | A1* | 10/2015 | Shinkai ............ G02F 1/133504 349/15 |
| 2018/0267344 | A1 | 9/2018 | Wu |
| 2018/0299595 | A1 | 10/2018 | Arbabi et al. |
| 2019/0278131 | A1 | 9/2019 | Li et al. |

FOREIGN PATENT DOCUMENTS

| | | |
|---|---|---|
| CN | 107734118 A | 2/2018 |
| CN | 109254339 A | 1/2019 |
| DE | 10 2016 004 842 A1 | 10/2017 |
| WO | WO 97/39277 A1 | 10/1997 |
| WO | WO 2005/083503 A1 | 9/2005 |
| WO | WO 2007/007242 A2 | 1/2007 |
| WO | WO 2009/123606 A1 | 10/2009 |

* cited by examiner

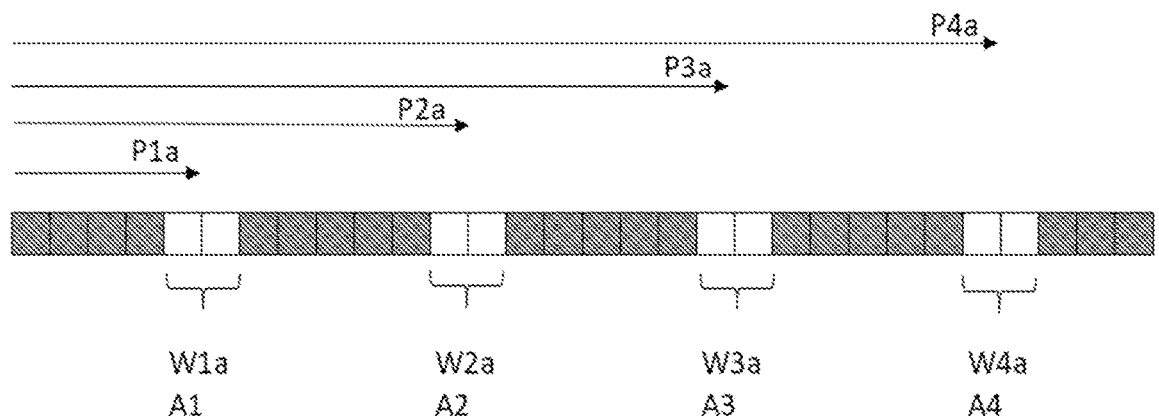
Fig.5a
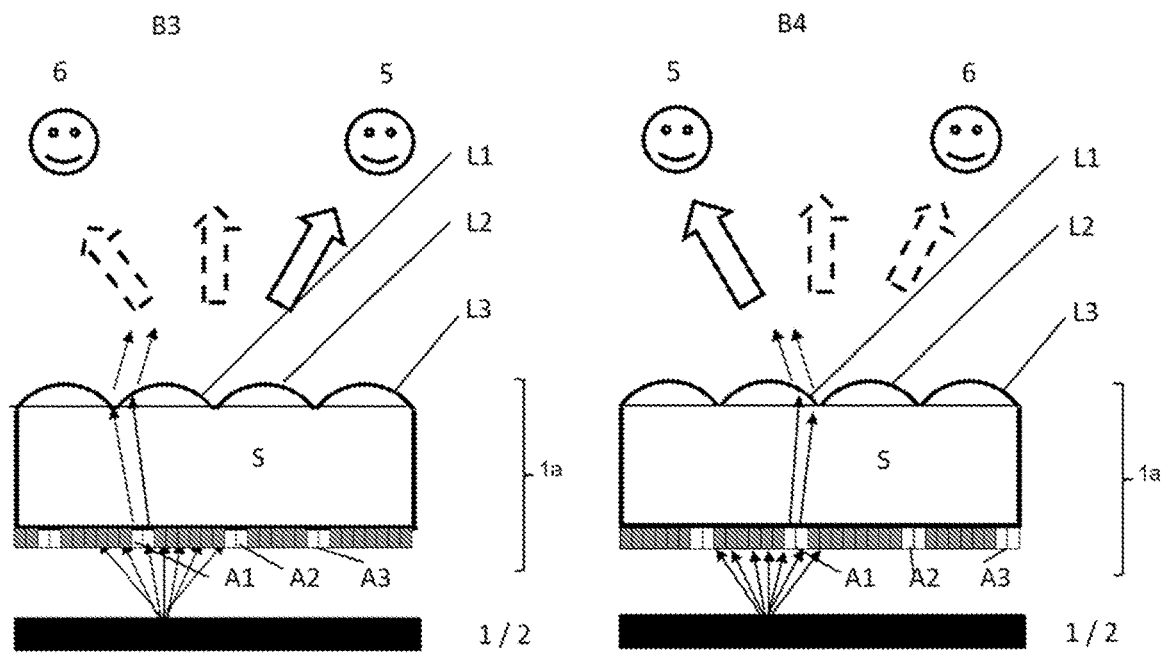
Fig.7
Fig.8
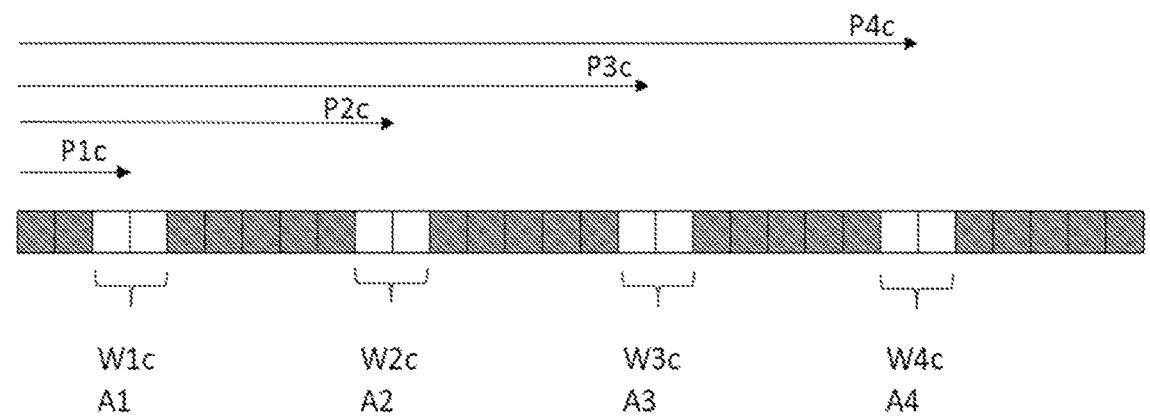
Fig.7a

OPTICAL ELEMENT FOR INFLUENCING LIGHT DIRECTIONS, ARRANGEMENT FOR IMAGING A MULTIPLICITY OF ILLUMINATED OR SELF-LUMINOUS SURFACES, AND ILLUMINATION DEVICE

PRIORITY CLAIM

The present application is a National Phase entry of PCT Application No. PCT/EP2021/058169, filed Mar. 29, 2021, which claims priority from German Patent Application No. 10 2020 002 323.1, filed Apr. 7, 2020, the disclosures of which are hereby incorporated by reference herein in their entirety.

FIELD OF THE INVENTION

The present invention is generally directed to an optical element, an arrangement and an illumination device. More specifically, the present invention is directed to an optical element, an arrangement and an illumination device which can influence the transmission or emission of light, respectively, in an angle-dependent manner and which can switch between at least two operating modes.

BACKGROUND OF THE INVENTION

In recent years, great strides have been made in widening the visual angle in LCDs. However, there are often situations in which this very large viewing angle area in a display screen is disadvantageous. Increasingly, information such as bank data or other personal information and sensitive data is also available on mobile devices, such as notebooks and tablets. Accordingly, there is a need to control whom may view these sensitive data. It should be possible to choose a wide viewing angle for sharing information on a display with others, e.g., when viewing vacation photographs or for advertising purposes. On the other hand, a small viewing angle is required when it is desirable to treat the displayed information confidentially.

A similar problem arises in automotive engineering. In this case, the driver must not be distracted by image contents, e.g., digital entertainment programs, when the engine is operating, but the passenger would also like to view these image contents during the drive. Consequently, there is a need for a display screen which can switch between the corresponding display modes.

Add-on films based on microlouvers have already been used for mobile displays in order to protect visual data. However, these films were not switchable/convertible; they always had to be manually applied first and then removed again subsequently. They also had to be transported separately from the display when not needed. A further substantial drawback in the use of such louvered films is connected to the light losses entailed.

U.S. Pat. No. 5,956,107 A discloses a switchable light source with which a display screen can be operated in a plurality of modes. A drawback consists in that all outcoupling of light relies on scattering and, therefore, only low efficiency and suboptimal light direction effects are achieved. In particular, it is not disclosed in more detail how to achieve a focused light cone.

CN 107734118 A describes a display screen which renders the viewing angle of a display screen controllable by means of two backlights. The upper backlight of the two backlights should emit focused light for this purpose. In particular, a grating with opaque portions and transparent portions is mentioned as an embodiment to this end. Presumably, as a result of this, the light of the second backlight which must pass through the first backlight in direction of an LCD panel is also focused and, consequently, the public viewing mode which is actually provided for a wide viewing angle suffers an appreciable narrowing of angle.

US 2007/030240 A1 describes an optical element for controlling the light propagation direction of light originating from a backlight. This optical element requires, for example, liquid crystals in the form of PDLCs, which is expensive on the one hand and poses a safety risk on the other hand, especially for consumer applications, because PDLC liquid crystals generally require voltages higher than 60 V for their circuitry.

CN 1987606 A again describes a display screen which renders the viewing angle of a display screen controllable by means of two backlights. In particular, a "first light plate" is used. This first light plate must be wedge-shaped in order to allow the light to be coupled out in a focused manner as intended. Exact details for achieving the focused light outcoupling with appropriate angle conditions are not disclosed.

Further, CN 106195766 A discloses two light sources for switching between two illumination modes. In this case, sawtooth-shaped outcoupling structures are used for coupling out focused light. A disadvantage herein consists in that vertical interference edges are also present in the sawtooth-shaped outcoupling structures, which makes it more difficult or even impossible to sharply focus light as would be required for a private viewing mode.

Further, US 2018/0267344 A1 describes a setup with two flat illumination modules. In this case, the light of the illumination module located in the rear with reference to viewing direction is focused through a separate structure. After focusing, the light must still pass through the front illumination module which has scattering elements. Accordingly, a sharp light focusing cannot be implemented in an optimal manner for protected viewing.

Lastly, US 2007/0008456 A1 discloses dividing a light emission angle into at least three ranges, light generally impinging on two of these three ranges. It follows that a display illuminated in this way is visible from more than one direction. Therefore, privacy is not sufficiently safeguarded.

The methods and arrangements mentioned above generally share the drawback that they appreciably reduce the brightness of the basic display screen and/or require a complicated and expensive production and/or reduce the resolution in the public viewing mode and/or only allow limited private viewing.

SUMMARY OF THE INVENTION

Therefore, it is the object of the invention to describe an optical element, an arrangement and an illumination device which can influence the transmission or emission of light, respectively, in an angle-dependent manner and which can switch between at least two operating modes. The optical element is to be inexpensively implementable and universally usable particularly with diverse types of display screen in order to enable switching between a private viewing mode and a public viewing mode in such a way that the resolution of such a display screen is not significantly reduced. The corresponding arrangement is likewise to enable both viewing modes for selected types of imager.

The above-stated object is met according to the invention by an optical element comprising a substantially plate-shaped or shell-shaped substrate S with a first large surface formed as light entrance surface and a second large surface formed as light exit surface, a multiplicity of imaging elements L1, L2, L3, ... formed on the second large surface of the substrate S, a multiplicity of diaphragms A1, A2, A3, ... formed on or near (by "near" is meant herein that the distance is at most on the order of three times the thickness of the substrate S) the first large surface of the substrate S, the quantity of diaphragms A1, A2, A3, ... being no less than the quantity of imaging elements L1, L2, L3, ... , and every diaphragm A1, A2, A3, ... comprising at least one transparent region within an opaque region, the optical element can be actuated by electromagnetic switching means with one or more electromagnetic fields to switch between at least a first operating mode B1 and a second operating mode B2 in that at least some of the imaging elements L1, L2, L3, ... are actuated to change their focal length between values f1 and f2 and/or at least some of the diaphragms A1, A2, A3, ... are actuated to change their aperture width between values W1$a$ and W1$b$, W2$a$ and W2$b$, W3$a$ and W3$b$, ... and/or their position between two values P1$a$ and P1$b$, P2$a$ and P2$b$, P3$a$ and P3$b$, ... in a plane parallel to the first large surface, and exactly one diaphragm A1, A2, A3, ... is associated with each imaging element L1, L2, L3, ... at least in the first operating mode B1 so that light passing through such a diaphragm A1, A2, A3, ... is imaged (generally, this means collimated) by the corresponding associated imaging element L1, L2, L3, ... , as a result of which light which arrives in the optical element through the diaphragms A1, A2, A3, ... and, after that, through the light entrance surface of the substrate S has different propagation angles, measured in one or two preferential directions, in the at least two operating modes B1 and B2 after passing through the associated imaging elements L1, L2, L3, ... .

It should be noted with regard to variables convention: in operating mode B1, diaphragms A1, A2, A3, ... have aperture widths W1$a$ (diaphragm A1), W2$a$ (diaphragm A2), W3$a$ (diaphragm A3), ... —generally Wxxxa—and positions P1$a$ (diaphragm A1), P2$a$ (diaphragm A2), P3$a$ (diaphragm A3), —generally, Pxxxa. Further, in operating mode B2, diaphragms A1, A2, A3, ... have aperture widths W1$b$ (diaphragm A1), W2$b$ (diaphragm A2), W3$b$ (diaphragm A3), ... —generally Wxxxb—and positions P1$b$ (diaphragm A1), P2$b$ (diaphragm A2), P3$b$ (diaphragm A3), —generally, Pxxxba. Accordingly, in further operating modes B3, B4, ... , the variable names of the aperture widths Wxxx and positions Pxxx would end in c, d, ... . In this instance, "xxx" signifies a count value which can, of course, also exceed one thousand values.

Light which arrives in the optical element through the diaphragms A1, A2, A3, ... and subsequently through the light entrance surface of the substrate S propagates differently in space in the at least two operating modes B1 and B2 after passing through the associated imaging elements L1, L2, L3, ... . The corresponding propagation angles of the light are measured in a preferential direction and, for example, with the reference angle of 0° on the perpendicular bisector to the light exit surface of the substrate S. The preferential direction under consideration here is, for example, the horizontal sectional plane through the substrate S which forms the perpendicular bisector to the substrate S. For an observer, this preferential direction would manifest, for example, as the horizontal direction in front of the optical element. This can be transferred to curved surfaces by analogy.

Diaphragms are often also referred to as apertures, but the latter term sometimes lends itself to misunderstanding because it can also be used synonymously with aperture width and aperture size.

The first large surface and second large surface of the plate-shaped substrate are preferably arranged parallel to one another. However, in particular embodiments, for example, when particular angle-dependent transmissions of the optical element are to be achieved, they can also be arranged nonparallel, e.g., in a wedge-shaped or sawtooth-shaped manner with a defined angle of up to 20 degrees relative to one another. A shell-shaped configuration of the substrate is also possible, for example, for use in curved display screens. The large surfaces of the substrate then generally have a slight curvature along one direction, in some cases a double curvature.

The first large surface of the plate-shaped substrate, which large surface is formed as light entrance surface, is generally located on the back of the substrate as viewed by the observer and, depending on the application of the optical element, adjoins an image display device, a light source or illumination device, or a volume of air, for example. Light then enters the substrate through the aforementioned light entrance surface from the objects mentioned above.

At least two operating states are defined by the actuation with one or more electromagnetic fields. The angle-dependent transmission of visible light is less than 50% in the first operating mode B1 and greater than 50% in the second operating mode B2. This is true for angles greater than 30° (this limiting angle can also be varied, e.g., 10°, 20° or 25°) with reference to a selectable reference direction, for example, the surface normal of the second large surface of substrate S, and measured in a preferential direction perpendicular to an edge of the substrate S, preferably an edge which corresponds to a narrow side on the left-hand side or right-hand side as viewed by an observer. If the substrate has the shape of a parallelepiped—which is generally the case—and the narrow sides are oriented vertically and horizontally before a stationary observer, the preferential direction is preferably the horizontal direction. This may be applied analogously to shell-shaped substrates, in which case the preferential direction is also the horizontal direction. A shell-shaped substrate is generally also curved along this preferential direction.

In a preferred embodiment, the preferential direction lies perpendicular to an edge of the substrate S corresponding to a narrow side on the left-hand side or right-hand side as viewed by an observer, and the substrate S is divided into different regions along the preferential direction. An own reference direction is selectable for each region, all of the reference directions being pairwise distinct and having a tolerance of a few degrees to a maximum of 15 degrees in direction of an observer. This offers the advantage of an improved operating mode B1 in which—when utilizing the optical element with a display screen—an observer receives a more homogeneous impression when observing the display screen. If the switching is carried out by changing the aperture width of the diaphragms, for example, the diaphragms can close to a greater extent in operating mode B1 compared with configurations having a uniform reference direction and thus not only increase the homogeneity but also—as a result of the attendant greater narrowing of the angular range—enhance protection or privacy.

Because of the different reference directions in the different regions, the positions P1a, P2a, P3a, . . . in this case are generally slightly shifted for each diaphragm A1, A2, A3, . . . relative to the positions of the respective imaging elements L1, L2, L3, . . . correspondingly associated with them in parallel projection in direction of the perpendicular bisector to the substrate S.

It is advantageous that in this configuration the reference directions and the positions P1a, P2a, P3a, etc. of the diaphragms are selectable and variable depending on the position of an observer. Accordingly, an observer can change position in front of the optical element, or a display screen in which the optical element is installed, while maintaining the homogeneous effect and privacy simultaneously without the latter being significantly affected and without being limited to a central position in front of the display screen. In an advantageous further development, a display screen with an optical element realized in this way also has a tracking system which registers the position of the observer and, in association with a control, correspondingly adapts the reference directions and, consequently, the positions of the diaphragms P1a, P2a, P3a in operating mode B1 when the observer moves to the left or right in front of the display screen.

The imaging elements L1, L2, L3, . . . can be formed planar, spherical or aspherical, switchable or not switchable, as polymer lenses or glass lenses, as diffractive optics, gradient index optics, liquid crystal optics and/or plasmonic optics. Other configurations are also contemplated.

With respect to their outward form, it is possible that the imaging elements L1, L2, L3, . . . are flat (particularly in the case of gradient index optics or liquid crystal optics) and/or correspond to microlenses and/or lenticular lenses.

The diaphragms A1, A2, A3, . . . are preferably strip-shaped, circular, elliptical or rectangular. Other variants lie within the scope of the invention as does the possibility that one or more diaphragms A1, A2, A3, . . . simultaneously comprise(s) more than only one transparent region within an opaque region.

Insofar as the diaphragms A1, A2, A3, . . . are configured to be switchable, they can be formed as microfluidic channels which are either filled with (diaphragm narrow with aperture width W1a, W2a, W3a, etc.) or emptied of (diaphragm is enlarged or raised with aperture widths W1b, W2b, W3b, etc., where Wxxxb>Wxxxa) an opaque and/or reflective fluid by means of the switching, a reservoir being provided for the fluid, or are formed as electrochromic layers. Further variants include electrochromic liquids and/or switchable mirrors (e.g., electrochromic or with cholesteric liquid crystals) and/or electrophoretic liquids and/or electrowetting liquids. Beyond this, PDLC (polymer dispersed liquid crystals) or other liquid crystals are also contemplated as switchable diaphragms A1, A2, A3, . . . . However, other configurations are also possible.

Alternatively or simultaneously, the imaging elements L1, L2, L3, . . . can also advantageously be formed as switchable imaging elements, for example, using liquid crystals with variable refractive indices or using fluids which switch the respective imaging function via the change in pressure or position of the fluids. Such fluids would then be introduced, for example, into transparent chambers which embody the outer shape of the imaging elements, e.g., lenticular lenses.

Switching between at least two operating modes B1 and B2 through the actuation of the imaging elements L1, L2, L3, . . . and/or the diaphragms A1, A2, A3, . . . can also be actuated in other ways than by electromagnetic fields, for example, by means of chemical or electrochemical reactions, pressure, temperature and/or incident light. Explicitly, only some of the imaging elements L1, L2, L3, . . . or diaphragms A1, A2, A3, . . . may be switched to enable a localized switching between the first operating mode B1 and the second operating mode B2. To this end, the electromagnetic switching means for controlling would be divided into a plurality of separately switchable segments.

Further, it lies within the scope of the invention that the optical element can be switched by actuating with one or more electromagnetic fields to further operating modes B3, . . . in which the focal length of at least some of the imaging elements L1, L2, L3, . . . is changed to further values f3, . . . (where f3< >f2 and f3< >f1) and/or the aperture width of at least some of the diaphragms A1, A2, A3, . . . is changed to further values W1c, W2c, W3c and/or to further positions P1c, P2c, P3c, . . . .

The electromagnetic switching means advantageously have at least 50% transparency to light in the visible wavelength range incident in the substrate S perpendicularly via the light entrance surface. For example, this may entail ITO layers as electrodes provided, of course, with a corresponding electronic control.

A further advantageous configuration of the invention provides that all of the operating modes B1, B2, etc. which can be switched on are cycled through in a timed manner for a temporal-sequential influencing of the light direction. This can be utilized, for example, to generate images in two different directions, for example, in order that two different images which are displayed sequentially in time because of the optical element according to the invention are projected consecutively and cyclically in different directions. If this is performed fast enough, i.e., above the flicker fusion rate of the human eye, then, depending on the direction preset and image contents, either autostereoscopic displays (both eyes of an observer see two different images quasi-simultaneously) or two different images for two different observers (so-called dual view) are made possible simultaneously.

It is also always possible to show more than two images in a temporally sequential manner in more than two directions. This makes possible so-called multi-view 3D systems in which a certain kind of panoramic view is also made possible during head movement.

The invention acquires special practical significance when it is expanded to a display screen which can be operated in a first operating mode B1 for a limited viewing mode and in a second operating mode B2 for a public viewing mode. This comprises
  an optical element according to the invention as described in the preceding, and
  an image display device arranged downstream of the optical element as viewed from the perspective of an observer.

In this case, the image displayed by the image display unit is influenced by the optical element with respect to its light propagation directions as was described above. The display screen can have a flat or curved surface.

On the other hand, it is also possible to configure a different type of display screen which can be operated in a first operating mode B1 for a limited viewing mode and in a second operating mode B2 for a public viewing mode. This comprises
  a transmissive image display unit,
  an optical element according to the invention downstream of the image display unit as viewed from the perspective of an observer, and an area light source behind the optical element.

In this case, the light propagation directions of the light of the area light source are influenced due to the optical element according to the invention before the light impinges on and illuminates the image display unit.

A display screen described above solves a current problem in automotive engineering, namely, that the driver should not be distracted by image contents, such as digital entertainment programs, when the engine is switched on, whereas the passenger might want to view these image contents during the drive. Operating mode B1 is recommended in this regard. If contents should also be visible to the driver, operating mode B2 is activated.

The above-stated object of the invention is also met by an arrangement for imaging a multiplicity of illuminated or self-luminous surfaces F1, F2, F3, . . . which are arranged on a collective surface, comprising a substantially plate-shaped or shell-shaped substrate S with a first large surface formed as light entrance surface and a second large surface formed as light exit surface, the substrate being located in front of the multiplicity of illuminated or self-luminous surfaces F1, F2, F3, . . . with reference to viewing direction,
  a multiplicity of imaging elements L1, L2, L3, . . . formed on the second large surface of the substrate S,
  at most, one half as many imaging elements L1, L2, L3, . . . as surfaces F1, F2, F3, . . . being provided, and each imaging element L1, L2, L3, . . . covering at least two surfaces F1, F2, F3, . . . in viewing direction and being associated in each instance with at least two surfaces F1, F2, F3, . . . ,
  the arrangement being switchable between at least two operating modes B1 and B2 in that a first subset (not all) of the surfaces (F1, F2, F3, . . . ) is activated as a result of an actuation (e.g., by means of electromagnetic switching means) for operating mode B1, and a second subset of surfaces (F1, F2, F3, . . . ) disjoint from the first subset is activated for operating mode B2, the first subset and second subset optionally comprising a different quantity of elements, i.e., activated surfaces,
  as a result of which light which arrives in the substrate S through the light entrance surface from the respective activated surfaces F1, F2, F3, . . . is imaged (or collimated) in different propagation angles to different weighting factors after passing through the associated imaging elements L1, L2, L3, . . . in the at least two operating modes B1 and B2.

The subsets are strict subsets, also known as partial selections, i.e., each of the subsets comprises at least one surface but not all of the surfaces. The partial selection of surfaces F1, F2, F3, . . . for operating mode B1 can mean both that the corresponding complementary selection of the remaining surfaces remains dark and also that it is permanently switched to light, i.e., a light, more or less monochrome informationless image is emitted in the corresponding directions in which the remaining surfaces which are permanently switched to light are imaged. Moreover, it is possible that a randomized image (e.g., every surface lights up permanently with a random brightness value) or a predefined image (the corresponding surfaces permanently display a fixed image, such as a light logo) is applied to the complementary selection of the remaining surfaces. In the case of remaining surfaces that are not dark, a blooming of any residual light of the partial selection of surfaces F1, F2, F3, . . . possibly still present would then take place in unwanted imaging directions so that the effect of operating mode B1 is further amplified.

The possible configurations described above apply to the imaging elements L1, L2, L3, . . . and will not be repeated here in order to avoid redundancy. In this instance, the interrelationships between means and effect are overlapping: whereas with respect to the optical element the aperture widths have been changed or the diaphragm positions have possibly been shifted, the surfaces F1, F2, F3 in the arrangement according to the invention inherently have aperture widths and/or positions which are changed by the selections of the respective surfaces activated in the operating modes.

In this arrangement, the surfaces F1, F2, F3, . . . advantageously correspond to mini-LEDs or micro-LEDs. However, other types are possible, e.g., every surface can be a pixel or subpixel of an LCD panel, QLEDs, OLEDs or another type of display.

Lastly, the above-stated object of the invention is met by an illumination device which can be switched between at least two operating modes B1 and B2. This illumination device comprises—a multiplicity of illuminated or self-luminous surfaces F1, F2, F3, . . . which are arranged on a collective surface, a substantially plate-shaped or shell-shaped substrate S with a first large surface formed as light entrance surface and a second large surface formed as light exit surface, the substrate being located in front of the multiplicity of illuminated or self-luminous surfaces F1, F2, F3, . . . with reference to viewing direction,
  a multiplicity of imaging elements L1, L2, L3, . . . formed on the second large surface of the substrate S,
  at most, one half as many imaging elements L1, L2, L3, . . . as surfaces F1, F2, F3, . . . being provided, and each imaging element L1, L2, L3, . . . covering at least two surfaces F1, F2, F3, . . . in viewing direction and being associated in each instance with at least two surfaces F1, F2, F3, . . . ,
  the illumination device being switchable between at least two operating modes B1 and B2 in that a first subset (not all) of the surfaces (F1, F2, F3, . . . ) is activated as a result of an actuation (e.g., by means of electromagnetic switching means) for operating mode B1, and a second subset of surfaces (F1, F2, F3, . . . ) disjoint from the first subset is activated for operating mode B2, the first subset and second subset optionally comprising a different quantity of elements, i.e., the quantity of activated surfaces in the second subset differs from the quantity of activated surfaces in the first subset,
  as a result of which light which arrives in the substrate S through the light entrance surface from the respective activated surfaces F1, F2, F3, . . . is imaged in different propagation angles to different weighting factors after passing through the associated imaging elements L1, L2, L3, . . . in the at least two operating modes B1 and B2.

The subsets are strict subsets, also known as partial selections, i.e., each of the subsets comprises at least one surface but not all of the surfaces. In this case, however, the strict partial selection of surfaces F1, F2, F3, . . . for operating mode B1 can mean exclusively that the corresponding complementary selection of the remaining surfaces remains dark.

In this respect it is also possible for various surfaces F1, F2, F3, . . . to be imaged in different directions simultaneously.

The above-described illumination device can already be utilized as display element with—under some circumstances—low resolution (e.g., for local dimming effects) which can be operated for a restricted viewing mode in a first operating mode B1 and for a public viewing mode in a second operating mode B2. The illumination device according to the invention can be utilized with a high-resolution display screen which can be operated for a restricted viewing mode in a first operating mode B1 and for a public viewing mode in a second operating mode B2.

In addition, the latter comprises
a transmissive image display unit,
an illumination device as described above downstream of the image display unit as viewed from the perspective of an observer.

The above-mentioned configuration variants and interrelationships of means and effect of the method according to the invention apply analogously here and are not described again in order to avoid repetition.

The performance capability of the invention is basically retained when the above-described parameters are varied within certain limits.

It will be understood that the features mentioned above and those yet to be explained below may be used not only in the stated combinations but also in other combinations or alone without departing from the scope of the present invention.

BRIEF DESCRIPTION OF THE DRAWINGS

The invention will be explained in more detail in the following with reference to drawings which also disclose key features of the invention. The drawings show:

FIG. 5a a schematic diagram for illustrating the positions and aperture widths in the third embodiment of an optical element in operating mode B1;

FIG. 7 the schematic diagram of a third embodiment of an optical element according to the invention in operating mode B3;

FIG. 7a a schematic diagram for illustrating the positions and aperture widths in the third embodiment of an optical element in operating mode B3;

FIG. 8 the schematic diagram of a third embodiment of an optical element according to the invention in operating mode B4;

DETAILED DESCRIPTION OF THE DRAWINGS

The drawings are not to scale and are merely schematic depictions. Further, only a few selected elements and rays are shown in all of the drawings, although there is a multiplicity of diaphragms, imaging elements or rays in the physical embodiment.

Figure 1:
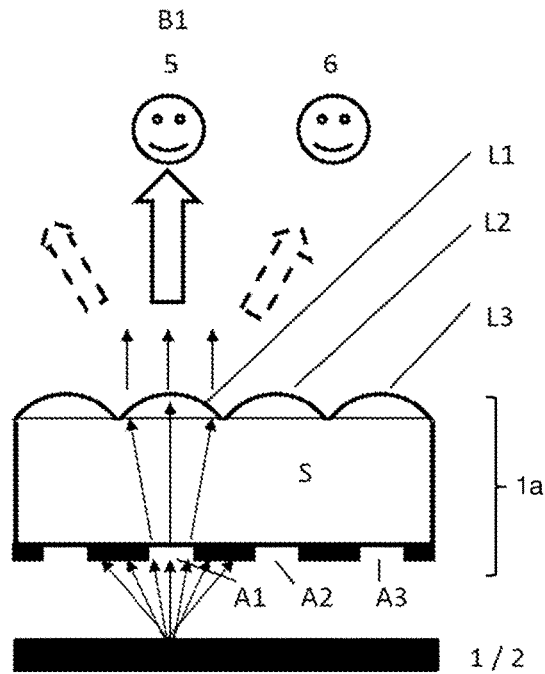
FIG. 1 the schematic diagram of a first embodiment of an optical element according to the invention in operating mode B1.
Figure 2:
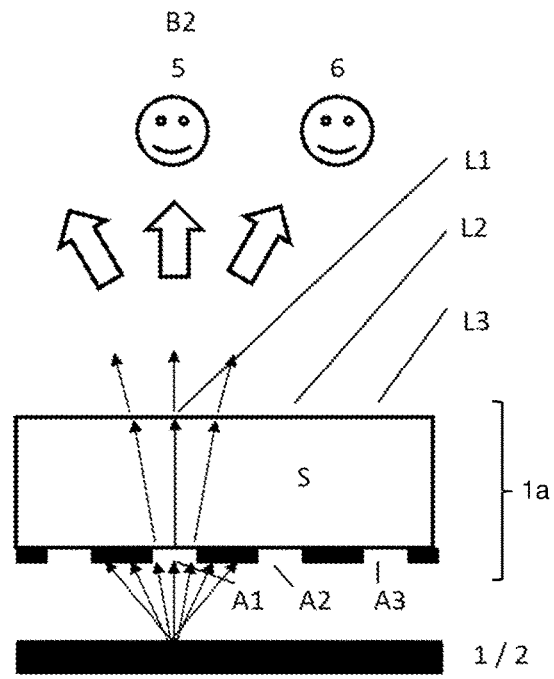
FIG. 2 the schematic diagram of a first embodiment of an optical element according to the invention in operating mode B2.

The schematic diagram of an optical element 1a according to the invention is shown in a first embodiment in operating mode B1 in FIG. 1 and in operating mode B2 in FIG. 2 initially in connection with an image display unit 1, for example, an OLED panel or LCD panel.

In this instance, the optical element 1a according to the invention comprises
a substantially plate-shaped or shell-shaped substrate S with a first large surface (on the bottom) formed as light entrance surface and a second large surface (on top) formed as light exit surface,
a multiplicity of imaging elements L1, L2, L3, . . . formed on the second large surface of the substrate S,
a multiplicity of diaphragms A1, A2, A3, . . . which are formed on or near the first large surface of the substrate S (in this example, "near" means that the distance is approximately on the order of magnitude of the thickness of the substrate S) and which are fixed in this embodiment, where the quantity of diaphragms A1, A2, A3, . . . is not less than that of the imaging elements L1, L2, L3, . . . , and where each diaphragm A1, A2, A3, . . . comprises at least one transparent region inside of an opaque region,
the optical element 1a is actuated by one or more electromagnetic fields which are controlled by electromagnetic switching means so that it can switch between at least a first operating mode B1 and a second operating mode B2 in that at least some of the imaging elements L1, L2, L3, . . . are actuated to change their focal length between values f1 and f2 and exactly one diaphragm A1, A2, A3, . . . is associated with each imaging element L1, L2, L3, . . . at least in operating mode B1 (see FIG. 1) so that light passing through such a diaphragm A1, A2, A3, . . . is imaged (or collimated) by the correspondingly associated imaging element L1, L2, L3, . . . , as a result of which only an observer 5 can see the image displayed by the image display unit 1 after passing through the optical element 1a, while an observer 6 positioned to the side does not see such an image from an oblique view (see dashed arrows).

Light which arrives in the optical element through the diaphragms A1, A2, A3, . . . and afterward through the light entrance surface of the substrate S propagates differently in space in each instance after passing through the associated imaging elements L1, L2, L3, . . . in the at least two operating modes B1 and B2. The corresponding propagation angles of the light are measured on the perpendicular bisector to the light exit surface of the substrate S in a preferential direction and, for example, with the reference angle of 0°. The preferential direction contemplated here extends, for example, in the drawing plane on the surface or on the light exit surface of the substrate S. This preferential direction would manifest itself to observers 5 and 6 as the horizontal direction in front of the optical element 1a.

In the operating mode B2 shown in FIG. 2, exactly one diaphragm A1, A2, A3, . . . is again associated with each imaging element L1, L2, L3, . . . so that light passing through such a diaphragm A1, A2, A3, . . . is imaged (or collimated) by the correspondingly associated imaging element L1, L2, L3, . . . . However, with the focal length f2 of infinity, the collimation is actually omitted and the light rays merely undergo a parallel offset through the substrate S which now acts as a plane-parallel plate.

Accordingly, observer 5 and an observer 6 next to observer 5 can both see the image displayed by the image display unit 1 after passage through the optical element 1a.

The first large surface and the second large surface of the plate-shaped substrate S are preferably arranged parallel to one another.

The angle-dependent transmission of visible light is less than 50% in the first operating mode B1 and is more than 50% in a second operating mode B2. This is true for angles greater than 30° (this limiting angle can also be varied, e.g., 10°, 20°, or 25° relative to a selectable reference direction, for example, the surface normal of the second large surface of the substrate S, and measured in a preferential direction perpendicular to an edge of the substrate S, preferably an edge that corresponds to a narrow side on the left or right from the point of view of an observer.

In this first embodiment, the imaging elements L1, L2, L3, . . . can correspond to switchable, spherical and/or aspherical lenticular lenses, for example, utilizing liquid crystals with variable refractive index or by utilizing fluids which switch the respective imaging function via pressure or change of position. Cholesteric liquid crystal cells are contemplated in which the lens effect produces a gradient index lens due to alignment and/or the topology of the substrate is utilized. Other configurations are also contemplated.

The diaphragms A1, A2, A3, . . . are preferably strip-shaped, circular, elliptical or rectangular.

Figure 14:
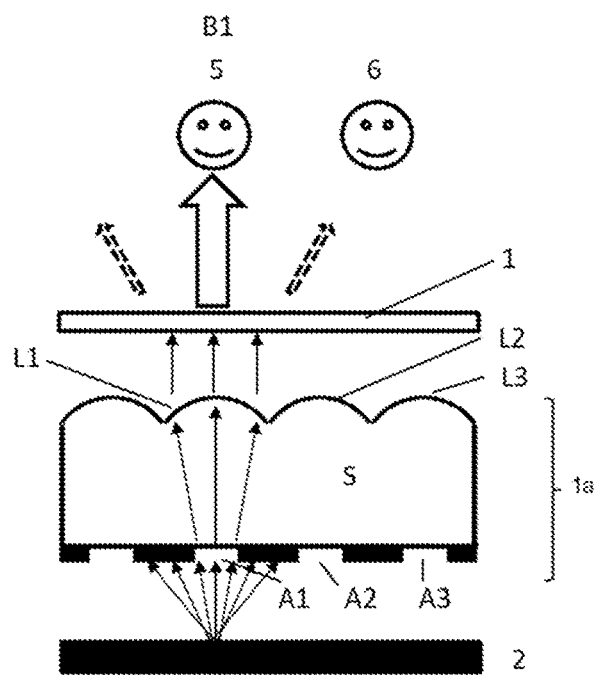
FIG. 14 the schematic diagram of a first embodiment of an optical element according to the invention in operating mode B1 in connection with an image display device and an area light source.
Figure 15:
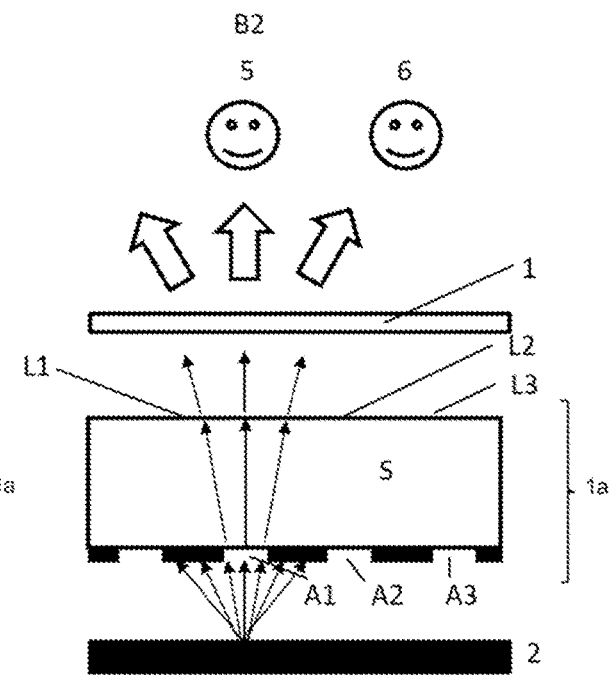
FIG. 15 the schematic diagram of a first embodiment of an optical element according to the invention in operating mode B2 in connection with an image display device and an area light source.

In case the object situated below the optical element 1a in the first embodiment is not an image display device 1 but rather an area light source 2 (as denoted in FIG. 1 and the subsequent drawings by "½"), the above-mentioned influences due to the optical element 1a apply in a corresponding manner. This is also a very advantageous embodiment of the invention. In this case, the unit formed of the optical element 1a and the area light source 2 can be utilized as switchable illumination device for transmissive image display devices, such as LCD panels, in order to operate them selectively in operating modes B1 and B2. This application option also applies to the second and third embodiments in connection with the drawings FIG. 3 to FIG. 8 and is therefore not repeated in the following. However, it will be briefly explained referring to FIG. 14 and FIG. 15. Thus FIG. 14 shows the schematic diagram of an optical element 1a according to the invention in a first embodiment in operating mode B1 in connection with an image display device 1 and an area light source 2. Correspondingly, FIG. 15 shows operating mode B2. The comments referring to FIG. 1 and FIG. 2 apply here in an analogous sense, the transmissive image display device 1, for example, an LCD panel, being arranged between the optical element 1a and the observers 5 and 6. The latter is backlit in operating mode B1 with a limited angular range such that an image displayed thereon is visible only from a limited angular range. Accordingly, such an image would be seen by observer 5 but not by observer 6. In contrast, a wide (e.g., horizontal) angle is made possible in operating mode B2 (see FIG. 15) such that the image is visible for the observers 5 and 6 (and possibly for other observers not shown here).

Figure 3:
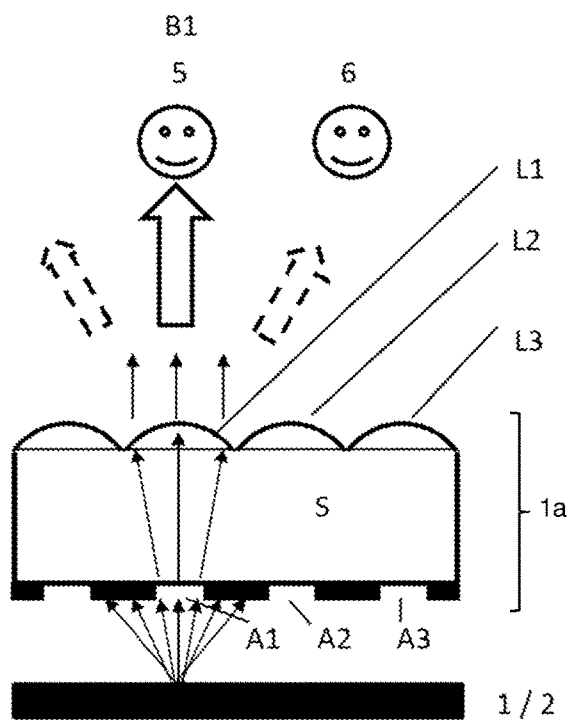
FIG. 3 the schematic diagram of a second embodiment of an optical element according to the invention in operating mode B1.
Figure 4:
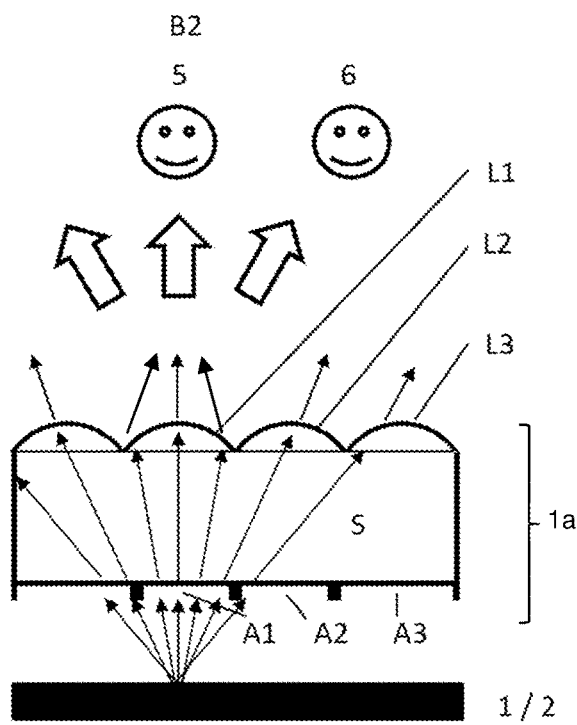
FIG. 4 the schematic diagram of a second embodiment of an optical element according to the invention in operating mode B2.

The second embodiment of an optical element 1a according to the invention is shown schematically in operating mode B1 in FIG. 3 and in operating mode B2 in FIG. 4, in this case in connection with an image display unit 1, for example, an OLED panel or LCD panel.

The imaging elements L1, L2, L3, . . . are not switchable in this second embodiment. On the other hand, by means of an actuation with one or more electromagnetic fields generated by electromagnetic switching means (or other suitable types of actuation), it is possible in this case to change the aperture width of at least some of the diaphragms A1, A2, A3, . . . between values W1a and W1b, W2a and W2b, etc. and/or to change the position of at least some of the diaphragms A1, A2, A3, . . . between two values P1a and P1b, P2a and P2b, etc. in a plane parallel to the first large surface.

Figure 3A:
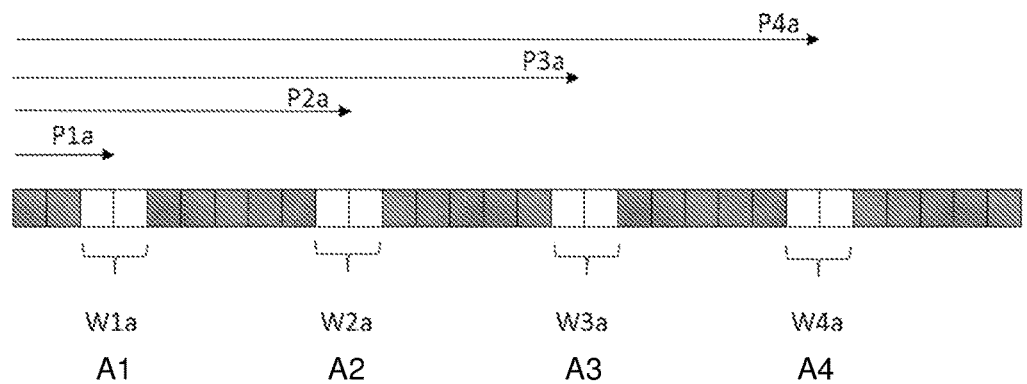
FIG. 3a a schematic diagram for illustrating the positions and aperture widths in the second embodiment of an optical element in operating mode B1.

FIG. 3a illustrates the positions and aperture widths in the second embodiment of an optical element in operating mode B1. Diaphragm A1 has its center at location P1a, diaphragm A2 has its center at P2a, and so on (measured in this instance from the left-hand edge of the substrate, for example). Further, diaphragm A1 has an aperture width of W1a, diaphragm A2 has an aperture width of W2a, etc.

Accordingly, either the transparent or the nontransparent portion of each diaphragm A1, A2, A3, . . . is imaged via the collimation through the imaging elements L1, L2, L3, . . . as a result of which, again under the conditions shown in FIG. 3 for operating mode B1, an observer 5 can see the image displayed on the image display unit 1, but an observer 6 next to observer 5 cannot see it. Conversely, under the conditions shown in FIG. 4, both observers 5 and 6 would see such an image because the diaphragms A1, A2, A3, . . . have been changed in this case to a maximum of the transparent aperture (aperture width Wxxxb, where Wxxxb>Wxxxa, i.e., W1b>W1a, W2b>W2a, etc.) so that imaging is possible in a large solid angle in front of the optical element 1a.

Figure 4A:
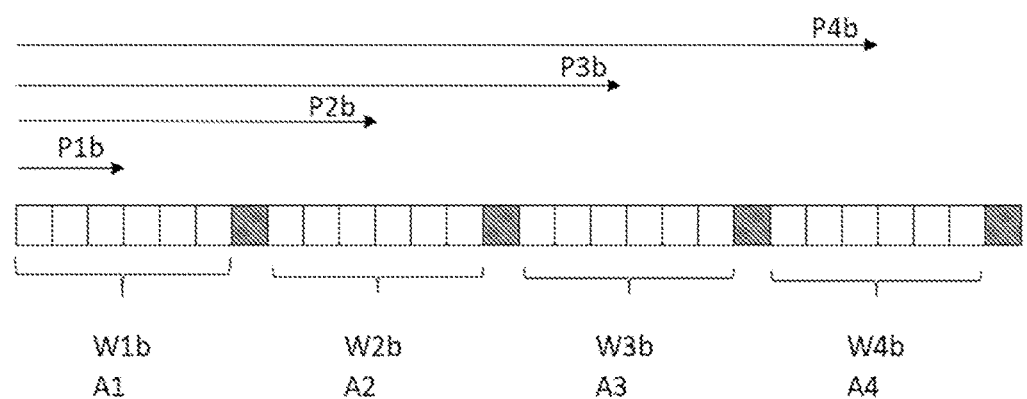
FIG. 4a a schematic diagram for illustrating the positions and aperture widths in the second embodiment of an optical element in operating mode B2.

In this regard, FIG. 4a illustrates the positions and aperture widths of the second embodiment of an optical element in operating mode B2. Accordingly, diaphragm A1 has its center at location P1b, diaphragm A2 has its center at P2b, and so forth (in this case again measured from the left-hand edge of the substrate, for example). Further, diaphragm A1 has an aperture width of W1b, diaphragm A2 has an aperture width of W2b, etc. Accordingly, switching to operating mode B2 has caused the aperture widths Wxxx of diaphragms A1, A2, . . . to increase.

In this second embodiment, as in the other exemplary embodiments of the optical element 1a, the aperture widths Wxxxa and Wxxxb (and possibly further values Wxxxc, etc.) move between about one fifth and twenty-times the width (or height) of the smallest picture elements (pixels or color subpixels) of the image display unit 1. However, other values are also conceivable for particular embodiments.

The switchable diaphragms A1, A2, A3, . . . may be formed as microfluidic channels which are either filled with (diaphragm active, i.e., restricted aperture width Wxxxa active) or emptied of (diaphragm with large aperture width Wxxxb, where Wxxxb>Wxxxa, the diaphragm can not only be opened physically at maximum aperture but can then also be completely transparent) an opaque and/or reflective liquid by means of switching, or can be formed as electrochromic layers. Other embodiments are also possible.

In case of a reflective liquid and also in case of a switchable mirror, for example, observers 6 from the side would not necessarily see a black image in this instance, but rather a reflection of the objects located in front of the optical element 1a, which further enhances the private viewing effect.

The switching between at least two operating modes B1 and B2 by controlling the imaging elements L1, L2, L3, . . . and/or the diaphragms A1, A2, A3, . . . can also be actuated in ways other than by electromagnetic fields, for example, by means of chemical or electrochemical reactions, pressure, temperature and/or incident light.

Explicitly, in all of the embodiments of the invention, it is also possible for only some of the imaging elements L1, L2, L3, . . . or diaphragms A1, A2, A3, . . . , respectively, to be switched in order to enable localized switching between the first operating mode B1 and the second operating mode B2. To this end, for example, the electromagnetic switching means would be divided into a plurality of separately switchable segments for actuation.

Further, it lies within the scope of the invention to select further operating modes B3, . . . etc. in which the focal length of at least some of the imaging elements L1, L2, L3, . . . changes to a value f3, . . . due to actuation with one or more electromagnetic fields and/or the aperture width of at least some of the diaphragms A1, A2, A3, . . . changes to a value W1c, W2c, W3c, . . . by actuation with one or more electromagnetic fields.

In this connection, FIG. 5 to FIG. 8 schematically show a third embodiment of an optical element 1a according to the invention in operating modes B1 to B4 in which the optical element 1a is again arranged in front of an image display device 1, for example, an LCD panel. Here the selected variant is that in which the aperture width of at least some of the diaphragms A1, A2, A3, . . . changes, respectively, to values Wxxxa to Wxxxd for operating states B1 to B4 by means of an actuation with one or more electromagnetic fields, while the imaging elements L1, L2, L3, . . . have fixed imaging characteristics. The diaphragms are realized in this case, for example, by means of a liquid crystal shutter which allows not only the aperture widths Wxxxa to Wxxxd to be changed but also the positions Pxxxa to Pxxxd of the diaphragms A1 to A4 to be shifted. In this connection, it would also be possible, for example, to design the diaphragms on the basis of electrowetting or electrophoresis or magnetophoresis.

Figures 5, 6:
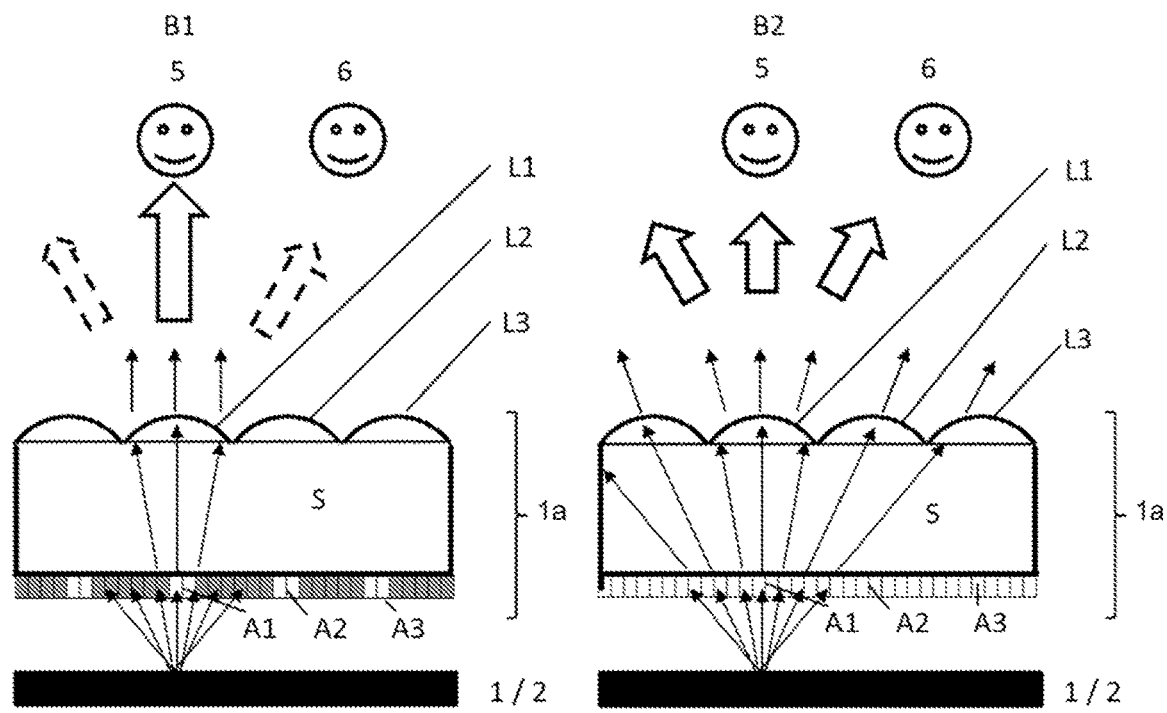
FIG. 5 the schematic diagram of a third embodiment of an optical element according to the invention in operating mode B1.
FIG. 6 the schematic diagram of a third embodiment of an optical element according to the invention in operating mode B2.

FIG. 5a is used for the conditions according to FIG. 5 to illustrate the aperture widths and positions in operating mode B1. Diaphragm A1 has its center at location P1a, diaphragm A2 has its center at P2a, and so on (measured here from the left-hand edge of the substrate, for example). Further, diaphragm A1 has an aperture width of W1a, diaphragm A2 has an aperture width of W2a, and so on. Under the conditions shown in FIG. 6, i.e., operating mode B2, the positions Pxxxb of diaphragms A1, A2, A3 are the same as in operating mode B1 (see FIG. 3a), but the aperture widths Wxxxb of the diaphragms A1, A2, A3, . . . are at their maximum, which is not shown to avoid redundancy. Accordingly, either the transparent portion or the nontransparent portion of each diaphragm A1, A2, A3, . . . is imaged via the collimation by means of the imaging elements L1, L2, L3, . . . , as the result of which, again in accordance with the conditions shown in FIG. 5 for operating mode B1, an observer 5 can see the image displayed on the image display unit 1, while an observer 6 next to observer 5 cannot see it. Conversely, according to the conditions shown in FIG. 6, both observers 5 and 6 would see such an image because the diaphragms A1, A2, A3, . . . have been changed here in operating mode B2 to a maximum of the transparent opening (aperture width Wxxxb, where Wxxxb>Wxxxa) so that the imaging is made possible within a large solid angle in front of the optical element 1a.

Lastly, the conditions illustrated in FIG. 7 allow an observer 5, positioned differently this time, to view the displayed image, while observer 6 at another position can once more not see the image, which corresponds to a third operating mode B3. The basis for this consists in that while the aperture width Wxxxc approximately corresponds to Wxxxa in each instance, the diaphragms A1, A2, A3, . . . are now shifted to the left, i.e., have different positions Pxxxc, compared to the conditions according to FIG. 5. Correspondingly, according to FIG. 8, the diaphragms A1, A2, A3, . . . with the same aperture width Wxxxd=Wxxxc=Wxxxa are shifted to the right compared with the conditions shown in FIG. 5 to positions Pxxxd so that an observer 5 who is now located in a different position again can see the image contents, while an observer 6 cannot.

Figure 8A:
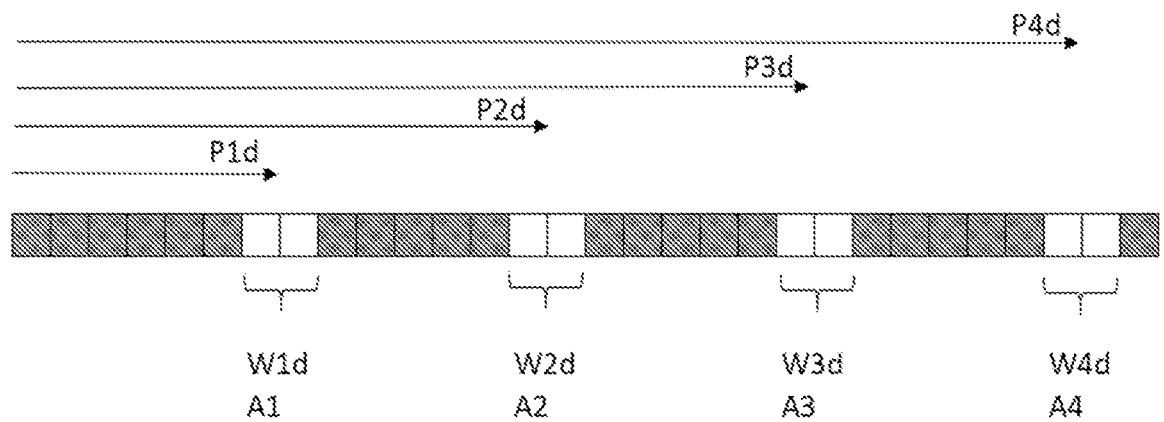
FIG. 8a a schematic diagram for illustrating the positions and aperture widths in the third embodiment of an optical element in operating mode B4.

In addition, FIG. 7a schematically shows the conditions for operating mode B3 in which the aperture widths Wxxxc of diaphragms A1, A2, A3 correspond to the aperture widths Wxxxa from operating mode B1. In this case, however, the positions Pxxxc are shifted compared with operating mode B1 in order to achieve the correspondingly required imaging. Further, FIG. 8a shows the conditions for operating mode B4 in which the aperture widths Wxxxd of the diaphragms A1, A2, A3 correspond to the aperture widths from operating mode B1. However, the positions Pxxxd have been shifted compared to operating modes B1 and B3.

The electromagnetic switching means and devices (e.g., ITO electrodes), not shown in the drawing, are advantageously at least 50% transparent to light in the visible wavelength range impinging into the substrate S perpendicularly via the light entrance surface.

A further advantageous embodiment of the invention provides that operating modes which can be selectively switched on, e.g., B3 and B4, are cycled for a temporal-sequential influencing of the light direction. This can be utilized, for example, to generate images in two different directions, for example, in order that two different images which are displayed sequentially in time because of the optical element according to the invention are projected consecutively and cyclically in different directions. If this is performed fast enough, i.e., above the flicker fusion rate, then, depending on the direction preset and image contents, either autostereoscopic displays (both eyes of an observer 5 see two different images quasi-simultaneously) or two different images for two different observers 5 and 6 (so-called dual view) are made possible simultaneously. Corresponding to the last-named possibilities, the optical conditions would be selected in such a way that the different images are rendered visible either in the average spacing between the eyes, but at least the average spacing between heads, of two observers situated next to one another.

Referring to drawings FIG. 9 to FIG. 13, an arrangement 8 according to the invention for imaging a multiplicity of illuminated or self-luminous surfaces F1, F2, F3, . . . arranged on a collective surface comprises the following components:

- a substantially plate-shaped or shell-shaped substrate S with a first large surface formed as light entrance surface and a second large surface formed as light exit surface, the substrate S being located in front of the multiplicity of illuminated or self-luminous surfaces F, F2, F3, . . . with reference to viewing direction,
- a multiplicity of imaging elements L1, L2, L3, . . . formed on the second large surface of the substrate S,
- at most, one half as many imaging elements L1, L2, L3, . . . as surfaces F1, F2, F3, . . . being provided, and each imaging element L1, L2, L3, . . . covering at least two surfaces F1, F2, F3, . . . in viewing direction and being associated in each instance with at least two surfaces F1, F2, F3, . . . ,
- the arrangement 8 being switchable between at least two operating modes B1 and B2 in that a first subset (not all) of the surfaces (F1, F2, F3, . . . ) is activated as a result of an actuation (e.g., by means of electromagnetic switching means) for operating mode B1, and a second subset of surfaces (F1, F2, F3, . . . ) disjoint from the first subset is activated for operating mode B2, the first subset and second subset optionally comprising a different quantity of elements, i.e., the quantity of activated surfaces in the second subset differs from the quantity of activated surfaces in the first subset,
- as a result of which light which arrives in the substrate S through the light entrance surface from the respective activated surfaces F1, F2, F3, . . . is imaged (or collimated) in different propagation angles to different weighting factors after passing through the associated imaging elements L1, L2, L3, . . . in the at least two operating modes B1 and B2.

Figure 9:
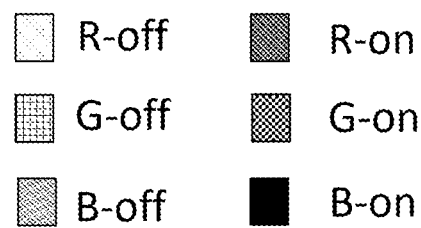
FIG. 9 a key explaining the meaning of surface markings referring to the following drawings FIG. 10 to FIG. 13, FIG. 10 the schematic diagram of an arrangement for imaging a multiplicity of illuminated or self-luminous surfaces in operating mode B1.

FIG. 9 shows a key explaining the meanings of surface markings referring to the drawings in FIG. 10 to FIG. 13. The two subsets are not empty and contain a smaller quantity of surfaces than there actually are. Accordingly, they are strict subsets. They can comprise different quantities of elements.

Figures 10, 11:
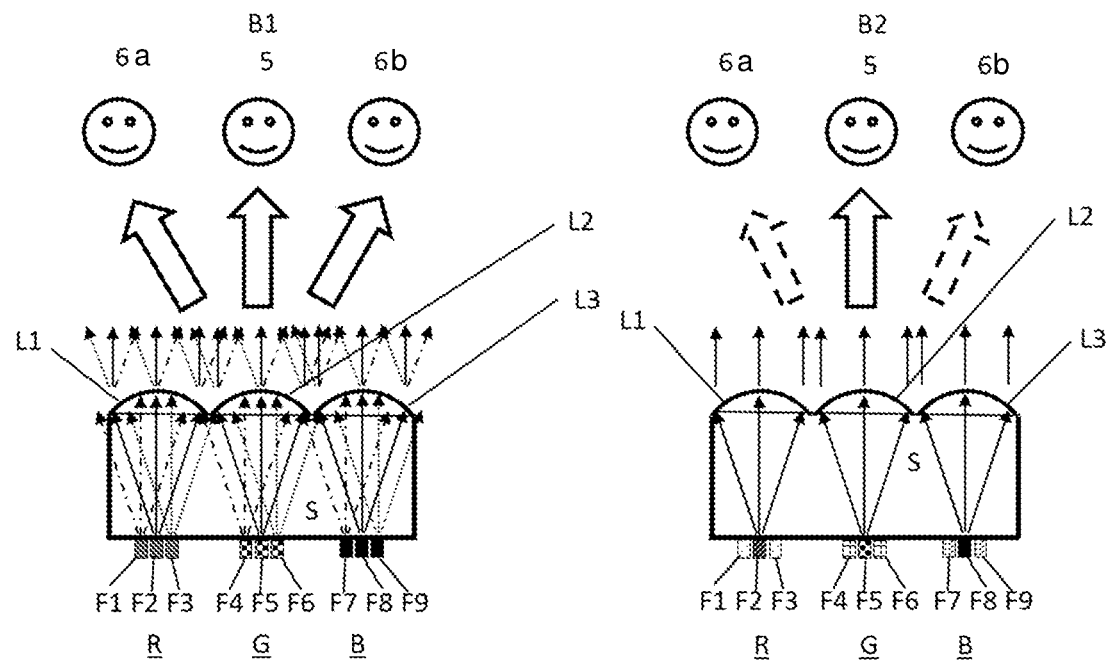
FIG. 11 the schematic diagram of an arrangement for imaging a multiplicity of illuminated or self-luminous surfaces in operating mode B2.
Figure 12:
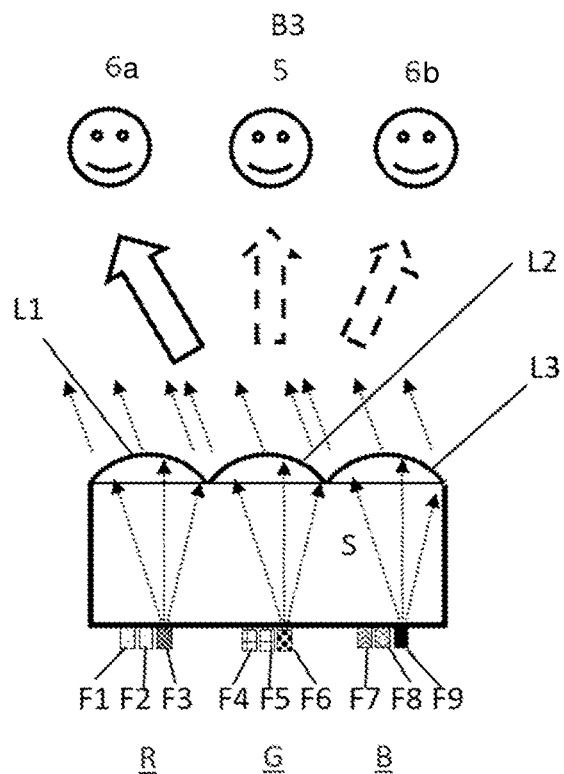
FIG. 12 the schematic diagram of an arrangement for imaging a multiplicity of illuminated or self-luminous surfaces in operating mode B3.
Figure 13:
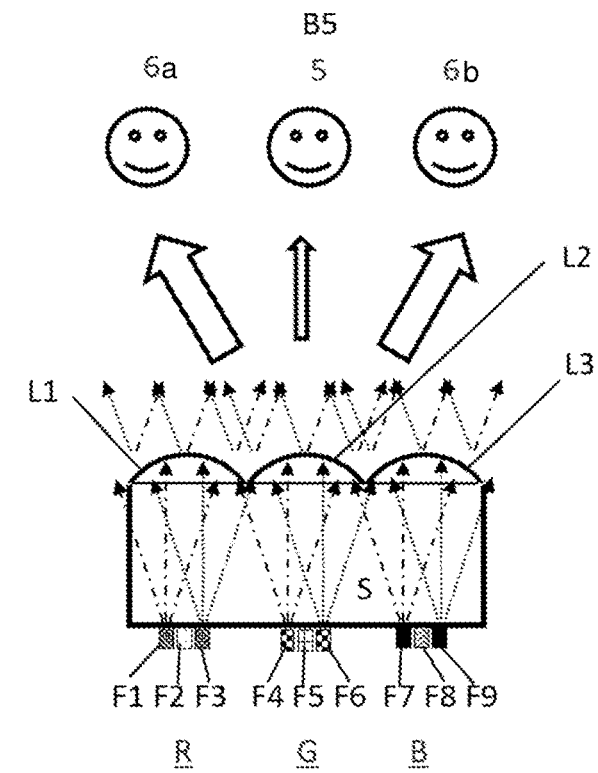
FIG. 13 the schematic diagram of an arrangement for imaging a multiplicity of illuminated or self-luminous surfaces in operating mode B5.

FIG. 10 shows the schematic diagram of an arrangement for imaging a multiplicity of illuminated or self-luminous surfaces in operating mode B1. Analogously, FIG. 11 to FIG. 13 show operating states B2, B3, and B5.

It is also explicitly possible to choose two different selections of surfaces F1, F2, F3, . . . for operating modes B1 and B2, each containing the same quantity of activated surfaces but each comprising at least two different surfaces F1, F2, F3, . . . .

The first subset of surfaces F1, F2, F3, . . . , in this instance comprising surfaces F2, F5, F8, for operating mode B1 can signify that the corresponding second subset, i.e., the complementary selection of the remaining surfaces F1, F3, F4, F6, F7, F9, remains dark and also that the latter are permanently switched to light, i.e., a light, more or less monochrome, informationless image is emitted in the corresponding directions in which the surfaces F1, F3, F4, F6, F7, F9 which are permanently switched to light are imaged. Further, it is possible that a randomized image (e.g., every surface luminesces permanently with a random value) or a predefined image (the corresponding surfaces F1, F3, F4, F6, F7, F9 permanently display a fixed image, for example, a light logo) is applied to the complementary selection of the remaining surfaces F1, F3, F4, F6, F7, F9.

The design possibilities described above apply to imaging elements L1, L2, L3, . . . and are not repeated here in order to avoid redundancy.

In this arrangement, the surfaces F1, F2, F3 advantageously correspond in each instance to micro-LEDs or mini-LEDs. However, other types are also possible, e.g., every surface can be a pixel or subpixel of an LCD panel or OLEDs and QLEDs or other type of imaging system.

The conditions according to FIG. 10 (operating mode B1) allow an observer 5 to view the displayed image, while observers 6a and 6b at other positions cannot see the image. This is because the correspondingly situated illuminated or self-luminous surfaces F2, F5, F8, . . . are only imaged in direction of observer 5 because of imaging elements L1, L2, L3, . . . .

On the other hand, in operating mode B2 according to FIG. 11, all of the illuminated or self-luminous surfaces F1, F2, F3, . . . are switched on so that the imaging elements L1, L2, L3, . . . image the displayed image information in many directions, and various observers 6a and 6b can see the image content.

Further, FIG. 12 shows operating mode B3 in which only observer 6a can see the image, while observers 5 and 6b cannot. This is possible because only illuminated or self-luminous surfaces F3, F6, F9, . . . are switched on and correspondingly imaged.

Finally, FIG. 13 shows operating mode B5 in which only observers 6a and 6b can see the image, while observer 5 cannot. This is achieved in that only illuminated or self-luminous surfaces F1, F3, F4, F6, F7, F9, . . . are switched on.

Further operating modes are conceivable in that still other selections are defined throughout all of the surfaces F1, F2, F3, . . . .

The illumination device according to the invention which is switched between at least two operating modes B1 and B2 comprises

- a multiplicity of illuminated or self-luminous surfaces F1, F2, F3, . . . which are arranged on a collective surface,
- a substantially plate-shaped substrate S with a first large surface formed as light entrance surface and a second large surface formed as light exit surface, the substrate S being located in front of the multiplicity of illuminated or self-luminous surfaces F1, F2, F3, . . . with reference to viewing direction,
- a multiplicity of imaging elements L1, L2, L3, . . . formed on the second large surface of the substrate S,
- at most, one half as many imaging elements L1, L2, L3, . . . as surfaces F1, F2, F3, . . . being provided, and each imaging element L1, L2, L3, . . . covering at least two surfaces F1, F2, F3, . . . in viewing direction and being associated in each instance with at least two surfaces F1, F2, F3, . . . , the illumination device being switchable between at least two operating modes B1 and B2 in that a first subset (not all) of the surfaces (F1, F2, F3, . . . ) is activated as a result of an actuation (e.g., by means of electromagnetic switching means) for operating mode B1, and a second subset of surfaces (F1, F2, F3, . . . ) disjoint from the first subset is activated for operating mode B2, the first subset and second subset optionally comprising a different quantity of elements, i.e., the quantity of activated surfaces in the second selection differs from the quantity of activated surfaces in the first partial selection, as a result of which light which arrives in the substrate S through the light entrance surface from the respective activated surfaces F1, F2, F3, . . . is imaged in different propagation angles to different weighting factors after passing through the associated imaging elements L1, L2, L3, . . . in the at least two operating modes B1 and B2.

The first subset of surfaces F1, F2, F3, . . . for operating mode B1 can only signify here that the second subset, i.e., the corresponding complementary selection of the remaining surfaces, remains dark. Neither of the two subsets is empty. They can contain different quantities of elements.

It is also possible that different surfaces F1, F2, F3, . . . are imaged simultaneously in different directions.

In order to visualize the manner of operation, reference is made again to FIG. 10 to FIG. 13 in which every surface F1, F2, F3, . . . in this instance generally corresponds to a controllable monochromatic or white illumination source such as a micro-LED, mini-LED, QLED or OLED. The preceding remarks relating to the arrangement according to the invention for imaging a multiplicity of illuminated or self-luminous surfaces F1, F2, F3, . . . apply analogously.

This illumination device can also be expanded to a display screen which can be operated in a first operating mode B1 for a limited viewing mode and in a second operating mode B2 for a public viewing mode. This comprises
  a transmissive image display unit,
  an illumination device such as that described above arranged downstream of the image display unit as viewed from the perspective of an observer.

Figure 16:
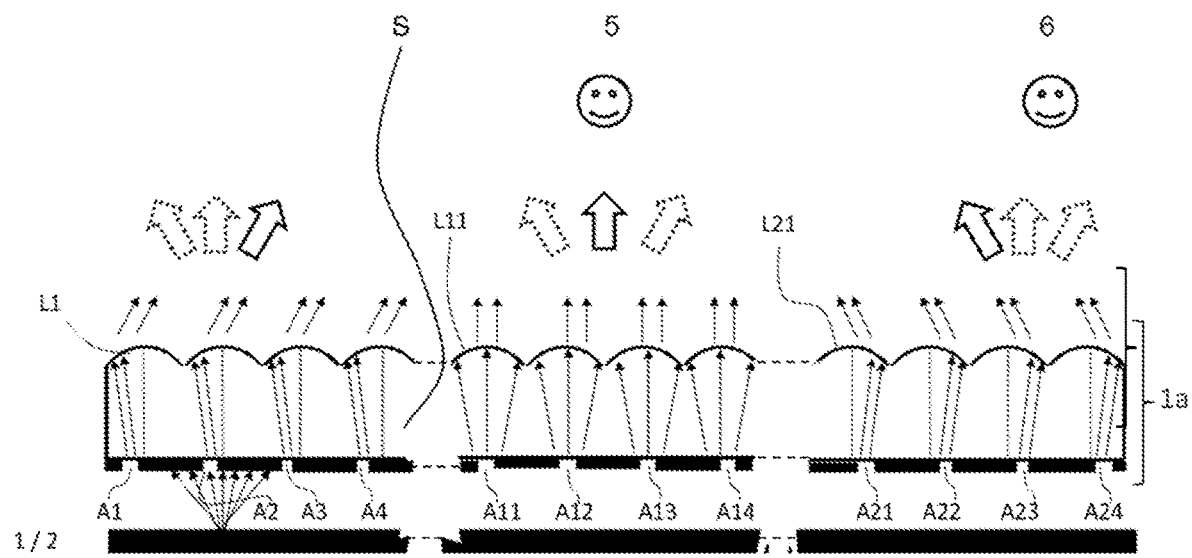
FIG. 16 an example of a further embodiment of an optical element in operating mode B1.

FIG. 16 shows an example (schematic diagram) of a further embodiment of an optical element 1a in operating mode B1. The preferential direction lies perpendicular to an edge of the substrate S corresponding to a narrow side on the left-hand side or right-hand side as viewed by an observer, and the substrate S is divided into different regions along the preferential direction. Further, an own reference direction is selectable for each region, all of the reference directions being pairwise distinct and having a tolerance of a few degrees to a maximum of 15 degrees in direction of an observer. This offers the advantage of an improved operating mode B1 in which—when utilizing the optical element with a display screen 1—an observer receives a more homogeneous impression when observing the display screen 1. The same holds true for such an optical element 1a with an area light source 2 combined with a transmissive imager. If the switching is carried out by changing the aperture widths Wxxxa of the diaphragms A1, A2, A3, for example, diaphragms can close to a greater extent in operating mode B1 compared with configurations having a uniform reference direction and thus not only increase the homogeneity but also—as a result of the attendant greater narrowing of the angular range—enhance protection and privacy.

FIG. 16 shows details of three regions (left, center, right) of the optical element, broken up as indicated by the dashed lines. Further, only selected diaphragms A1-A4, A11-A14 and A21-A24 are shown, although a multiplicity of such diaphragms is, in fact, necessary. The same applies to the depiction of the imaging elements L1, L11, . . . L21, etc.

Because of the different reference directions in the different regions, the positions P1a, P2a, P3a, . . . in this case are generally slightly shifted for each diaphragm A1, A2, A3, . . . relative to the positions of the respective imaging elements L1, L2, L3, . . . correspondingly associated with them in parallel projection in direction of the perpendicular bisector to the substrate S.

Figure 16A:
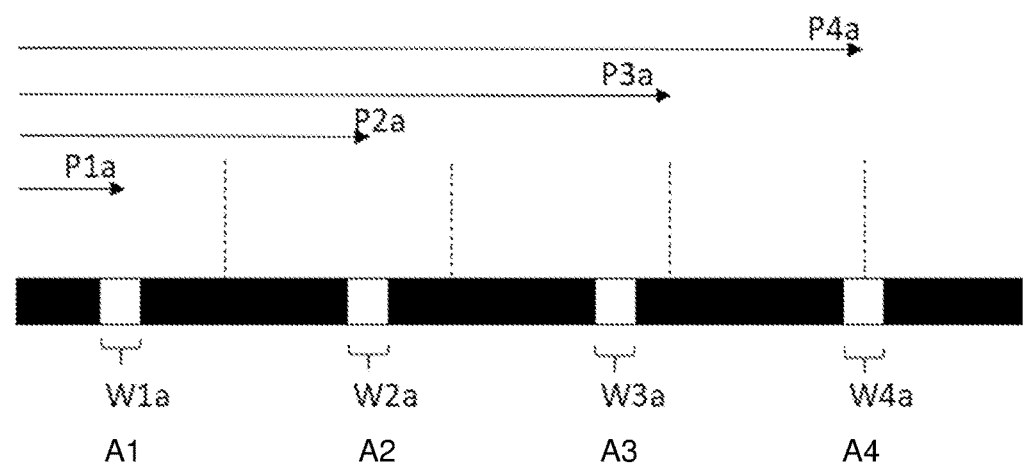
FIG. 16a an illustration of the positions and aperture widths of an optical element in the embodiment according to FIG. 16.

This is shown in FIG. 16a to illustrate the positions and aperture widths of an optical element in the embodiment according to FIG. 16. The dashed lines are intended to indicate where approximately the surface center of lenses L1, L2, . . . , is arranged in parallel projection in direction of the perpendicular bisector to the substrate S. The aperture widths Wxxxa of the diaphragms A1-A4 are identical here and, for example, can correspond approximately to one seventh up to one fourth of the width of the imaging elements L1-L4, i.e., for example, a few micrometers up to several tens of micrometers. However, the positions Pxxxa of diaphragms A1-A4 (and of all of the further diaphragms which are actually present) are selected in terms of the above-mentioned regions, i.e., FIG. 16a clearly shows that, in parallel projection, the positions P1a, P2a, P3a, . . . for each diaphragm A1, A2, A3, . . . are shifted in direction of the perpendicular bisector to the substrate S relative to the positions of the respective correspondingly associated imaging elements L1, L2, L3, . . . (the centers of which are indicated by the dashed lines).

This also translates analogously to curved optical elements for use in curved display screens, wherein the radius of curvature is preferably taken into account when the aperture widths and/or positions are changed, although it need not necessarily be taken into account.

The invention described above solves the proposed problem: an optical element is described which can influence the transmission in an angle-dependent manner (and, optionally, perpendicularly) and which can switch between at least two operating modes. The optical element is implementable inexpensively and, in particular, is universally usable with a wide variety of display screens in order to enable switching between a private viewing mode and a public viewing mode, and the resolution of such a display screen is not substantially reduced. The corresponding arrangement likewise enables the two viewing modes for selected types of luminescent surfaces. The same is true for the illumination device according to the invention in cooperation with a transmissive image display device.

The invention described above can advantageously be used in cooperation with an image display device anywhere that confidential data are displayed and/or entered, such as when entering a PIN number or displaying data in automatic teller machines or payment terminals or for entering passwords or when reading emails on mobile devices. The invention can also be applied, for example, in passenger cars or in aircraft and busses, where every passenger seat has its own display screen. Further cases of application lie within the field of lighting and advertisement, in particular for preventing light pollution.

LIST OF REFERENCE CHARACTERS

1 image display unit
1a optical element 2 area light source
5 observer
6 observer
6a, 6b observer
A1, A2, A3, . . . diaphragms
B1, B2, B3, B4 operating modes
L1, L2, L3, . . . imaging elements
F1, F2, F3, . . . illuminated or self-luminous surfaces
S substrate
W1a, W1b, W2a, W2b, . . . aperture widths of the diaphragms A1, A2, . . .
P1a, P1b, P2a, P2b, positions of the diaphragms A1, A2, . . .

The invention claimed is:

1. An optical element comprising:
a plate-shaped or shell-shaped substrate with a first large surface formed as a light-entrance surface and a second large surface formed as a light-exit surface,
a multiplicity of imaging elements formed on the second large surface of the substrate,
a plurality of diaphragms formed on or near the first large surface of the substrate, wherein a quantity of the plurality of diaphragms is not less than a quantity of the imaging elements, and wherein each diaphragm comprises at least one transparent region inside of an opaque region,
wherein the optical element, by way of actuation with one or more electromagnetic fields, is configured to be switched between at least a first operating mode and a second operating mode in that, via the actuation, at least some of the diaphragms are actuated to change their aperture width and/or their position in a plane parallel to the first large surface,
wherein exactly one diaphragm is associated with each imaging element at least in the first operating mode so that light passing through such a diaphragm is imaged by the associated imaging element,
as a result of which, light which arrives in the optical element through the diaphragms and then through the light-entrance surface of the substrate has different propagation angles, measured in one or two preferential directions, in the at least two operating modes after passing through the associated imaging elements, and an angle-dependent transmission of the arrived light is greater than 50% in the second operating mode and less than 50% in the first operating mode in an angular range of greater than 30° with reference to a selectable reference direction and measured in a preferential direction.

2. The optical element according to claim 1, wherein the reference direction is a surface normal of the second large surface of substrate, and/or wherein the preferential direction lies perpendicular to an edge of the substrate S.

3. The optical element according to claim 1, wherein the preferential direction lies perpendicular to an edge of the substrate S corresponding to a narrow side on the left-hand side or right-hand side as viewed by an observer, and the substrate S is divided into different regions along the preferential direction, and an own reference direction is selectable for each region, wherein all of the reference directions are pairwise distinct and face in a direction of an observer.

4. The optical element according to claim 1, wherein the optical element is configured to be switched by actuating with one or more electromagnetic fields to a further operating mode in which a focal length of at least some of the imaging elements is changed to further values and/or the aperture width of at least some of the diaphragms is changed to further values and/or to further positions.

5. The optical element according to claim 3, in which the substrate S is divided along the preferential direction into different regions with, in each instance, their own reference direction and, via the actuation, at least the positions of the diaphragms are selectable and variable depending on a position of an observer.

6. The optical element according to claim 1, wherein the imaging elements are microlenses or lenticular lenses.

7. The optical element according to claim 1, wherein the diaphragms are formed to be strip-shaped, circular, elliptical or rectangular.

8. The optical element according to claim 1, in which the diaphragms are switchable, wherein they are formed as microfluidic channels which are filled with or emptied of an opaque and/or reflective fluid via the switching, or are formed as electrochromic layers or electrochromic liquids and/or electrowetting liquids.

9. The optical element according to claim 1, wherein the imaging elements are formed as switchable imaging elements.

10. The optical element according to claim 1, wherein all of the operating modes which can be switched on are cycled through in a timed manner for a temporal-sequential influencing of the light direction.

11. A display screen which can be operated in a first operating mode for a limited viewing mode and in a second operating mode for a public viewing mode, comprising:
an optical element according to claim 1, and
an image display unit arranged downstream of the optical element from the perspective of an observer.

12. A display screen which can be operated in a first operating mode for a limited viewing mode and in a second operating mode for a public viewing mode, comprising;
a transmissive image display unit,
an optical element according to claim 1 downstream of the image display unit from a perspective of an observer, and
an area light source which is arranged behind the optical element.

13. A display screen according to claim 11, further comprising an eye tracking system.

14. The optical element of claim 1, wherein the optical element, by way of actuation with one or more electromagnetic fields, is configured to be switched between at least a first operating mode and a second operating mode in that, via the actuation, at least some of the imaging elements are actuated to change their focal length.

* * * * *